US011857483B1

(12) United States Patent
Huang

(10) Patent No.: US 11,857,483 B1

(45) Date of Patent: Jan. 2, 2024

(54) SEX TOY WITH UNIVERSAL CONNECTING STRUCTURE

(71) Applicant: Ciyi Huang, Dongguan (CN)

(72) Inventor: Ciyi Huang, Dongguan (CN)

( * ) Notice: Subject to any disclaimer, the term of this patent is extended or adjusted under 35 U.S.C. 154(b) by 0 days.

(21) Appl. No.: 18/220,716

(22) Filed: Jul. 11, 2023

(51) Int. Cl.
*A61H 23/00* (2006.01)
*A61H 23/02* (2006.01)
*A61H 19/00* (2006.01)

(52) U.S. Cl.
CPC ......... *A61H 23/0254* (2013.01); *A61H 19/32* (2013.01); *A61H 2201/1215* (2013.01); *A61H 2201/1454* (2013.01); *A61H 2201/1669* (2013.01); *A61H 2201/503* (2013.01)

(58) Field of Classification Search
CPC .... A61H 23/00; A61H 23/0254; A61H 19/00; A61H 19/32; A61H 19/44; A61H 2201/1669; A61H 2201/149
See application file for complete search history.

(56) References Cited

U.S. PATENT DOCUMENTS

| | | | | |
|---|---|---|---|---|
| 10,932,941 | B2 * | 3/2021 | Su | A61F 5/41 |
| 2013/0172669 | A1 * | 7/2013 | Lewis | A61H 19/30<br>600/38 |
| 2018/0021212 | A1 * | 1/2018 | Matsuura | A61F 5/453<br>600/38 |
| 2023/0072384 | A1 * | 3/2023 | Chen | A61H 19/32 |

* cited by examiner

*Primary Examiner* — Philip R Wiest
*Assistant Examiner* — Sarah B Lederer
(74) *Attorney, Agent, or Firm* — Che-Yang Chen; Law Office of Michael Chen

(57) ABSTRACT

A sex toy with universal connecting structure may include an outer cup body, a sperm collection cup sleeve, an inner cup body, a guide part, a power part, an eccentric wheel transmission assembly and an electric control part, wherein the inner cup body is slidably connected the inside of outer cup body through the guide part, the sperm collection cup sleeve is positioned between the outer cup body and the inner cup body, the cup mouth of the sperm collection cup sleeve is hermetically connected with that of the outer cup body, and the outer cup bottom of the sperm collection cup sleeve is connected with the inner cup bottom of the inner cup body. Since the universal ball head piece matches the universal ball head hole, the inner cup body can rotate along the universal ball head hole while reciprocating along the guide part.

10 Claims, 6 Drawing Sheets

SEX TOY WITH UNIVERSAL CONNECTING STRUCTURE

FIELD OF THE INVENTION

The invention relates to a sex toy, in particular to a sex toy for men with universal connecting structure.

BACKGROUND OF THE INVENTION

Under the circumstances of great pressure in modern society, sex toy such as masturbator cup is the device for relieving and releasing sex desires for men. Its shape and feeling are basically very similar to female vagina, which could provide users with real touch feelings. When there is a strong sexual desire for men, the sex toy could be their best sexual partner, not only for massaging, but also for relieving and releasing sex desires.

Conventional sperm extractor is disadvantageous due to its operating efficiency, low-speed torque, and rotational speed accuracy. The structure of the ejector pin and the cam is matched with the guiding rod to realize the directional telescopic action of the inner cup relative to the outer cup; the instruction signal is sent to the circuit control module through the key operation module, and after receiving the instruction signal, the circuit control module will drive the motor to run, thus driving the cam to rotate; after the cam rotates, the ejector pin will be driven to reciprocate, so that the inner cup could reciprocate in combination with the guiding rod through the reciprocating action of the ejector pin; finally, the soft cup body is driven to complete the telescopic action to realize the pleasure for men. Through this design, the whole structure of the product could be simple, the operation is stable, the strength is high, the stretching frequency is fast, the noise is low, the user's experience is improved.

However, the functional design of this kind of sperm extractor is not perfect, and it does not have the function of shaking and vibrating. It is not ideal to provide pleasure for men only by providing telescopic mode, especially for people with poor sensitivity. To sum up, a sex toy with shaking and vibrating function is needed for improvement.

SUMMARY OF THE INVENTION

A sex toy with universal connecting structure includes an outer cup body, a sperm collection cup sleeve, an inner cup body, a guide part, a power part, an eccentric wheel drive assembly and an electric control part; wherein the inner cup body is slidably connected inside the outer cup body through the guide part, the sperm collection cup sleeve is positioned between the outer cup body and the inner cup body, the cup mouth of the sperm collection cup sleeve is hermetically connected with the cup mouth of the outer cup body, the outer cup bottom of the sperm collection cup sleeve is connected with the inner cup bottom of the inner cup body. The power part and the electric control part are fixedly installed in the outer cup body, and are electrically connected, the eccentric wheel drive assembly is drivingly connected between the power part and the outer cup bottom of the inner cup body, the power part drives the inner cup body to reciprocate through the eccentric wheel drive assembly; the guide part includes the guiding rod arranged inside the outer cup body, the guiding slider slidably connected to the guiding rod, and the universal ball head piece arranged outside the inner cup body, the guiding slider is provided with the universal ball head hole matched with the universal ball head piece, and the universal ball head piece is movably connected to the universal ball head hole.

Preferably, the capsule bin with the backward opening could be formed on the outer side of the sperm collection cup sleeve, the vibrator is arranged in the capsule bin, and the vibrator is electrically connected with the electric control part through the opening of the capsule bin.

Preferably, there are two guide parts, which are evenly distributed between the outer cup body and the inner cup body.

Preferably, the guiding rod includes two fixing seats fixedly installed inside the outer cup body and two guiding rods connected between the two fixing seats; the two guiding rods are arranged in parallel, and the guiding slider is slidably connected with the two guiding rods.

Preferably, the universal ball head piece comprises the connecting column arranged outside the inner cup body and the universal ball rotatably connected to the connecting column, and the universal ball could be movably connected with the universal ball head hole.

Preferably, the universal ball head hole is in the structure of cylindrical, and the universal ball is in sliding contact with the inner wall of the universal ball head hole.

Preferably, the eccentric wheel drive assembly includes the eccentric wheel part dynamically connected to the power main body and the push block rotatably connected to the eccentric wheel part, the push block is fixedly connected with the inner cup body.

Preferably, the power part includes the motor base fixedly installed in the outer cup body and the motor fixedly installed in the motor base. The eccentric wheel part is provided with the turntable dynamically connected with the motor and the eccentric column which is arranged on the turntable and deviates from the axis of the turntable, and the push block is rotatably connected with the eccentric column.

Preferably, the electric control part includes the electric control board and the battery arranged inside the outer cup body. The electric control board is provided with the operation button and the charging interface exposed outside the outer cup body. The battery, the charging interface, the operation button, the power part and the vibrator are all electrically connected with the electric control board.

Preferably, the cup cover is also clamped at the cup mouth of the outer cup body to protect the sperm collection cup sleeve.

Compared with the prior art, the present invention is advantageous because the matching of the universal ball head piece and the universal ball head hole is utilized, so that the inner cup body could rotate along the position of the universal ball head hole in the process of reciprocating along the guide part; in addition, due to the transmission structure adopts the eccentric wheel transmission assembly, the inner cup body could swing when reciprocating, so that the reciprocating and swinging are simultaneously transmitted to the sperm collection cup sleeve, and the reciprocating action could assist the sperm collection and has the effect of swinging or generating vibration, which is beneficial to improving the efficiency of sperm collection. Besides, the matching of the universal ball head piece and the universal ball head hole is utilized, so that the smoothness and stability of the reciprocating operation of the inner cup body could be greatly improved, and finally, the power transmission efficiency is improved, and the noise generated by the operation of internal parts is reduced.

Additional aspects and advantages of the invention will be set forth in part in the description which follows, and in part will be obvious from the description which follows, or may be learned by practice of the invention.

DESCRIPTION OF THE DRAWINGS

In order to more clearly explain the embodiments of this invention or the technical scheme in the prior art, the drawings needed to be used in the description of the embodiments or the prior art will be briefly introduced below. Obviously, the drawings in the following description are only some embodiments of this invention, and for ordinary technicians in this field, other drawings could be obtained according to these drawings without paying creative labor.

DETAILED DESCRIPTION OF THE PREFERRED EMBODIMENTS

Figure 1:
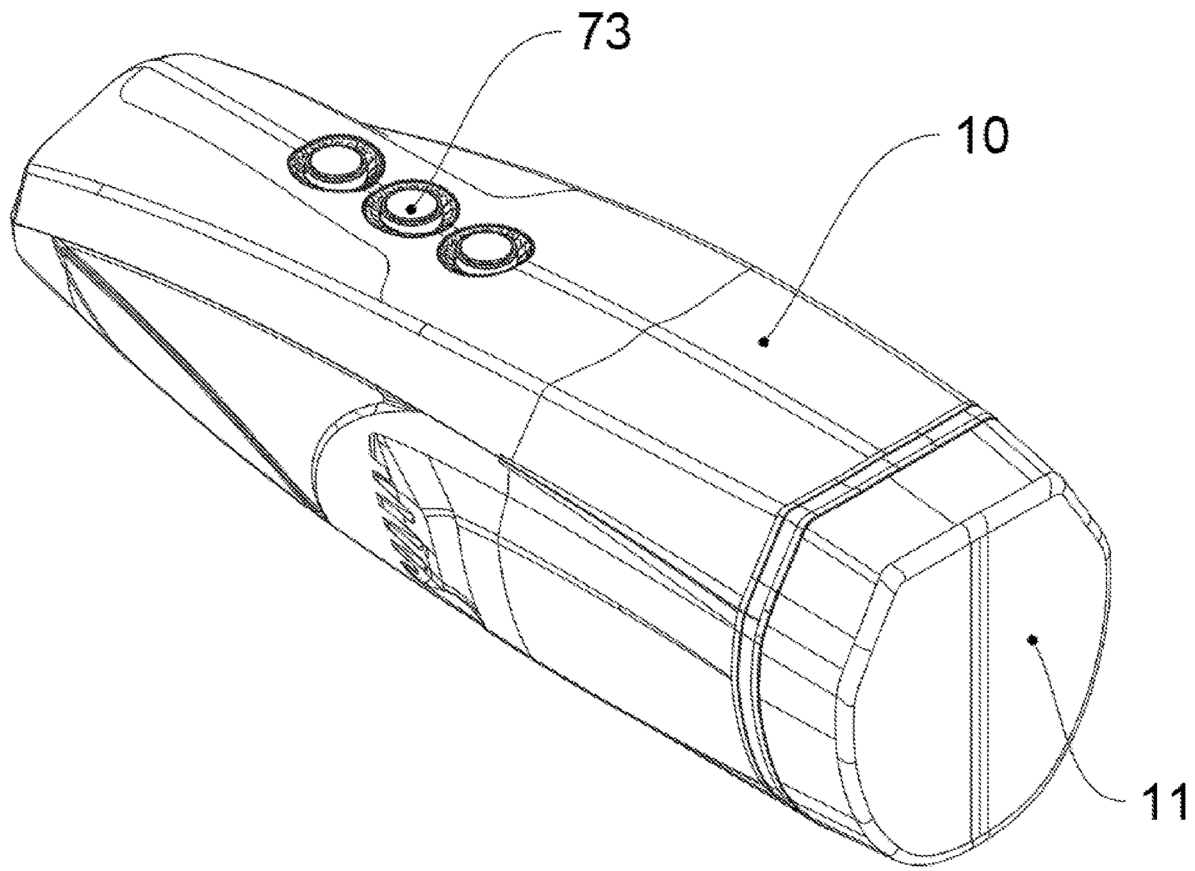
FIG. 1 is the perspective view of this invention.

The technical solutions in the embodiment of this invention will be described clearly and completely below. Obviously, the described embodiment is only the part of the embodiment of this invention, but not the whole embodiment. Based on the embodiments in this invention, all other embodiments obtained by ordinary technicians in the field without creative labor belong to the scope of protection of this invention.

Referring to FIGS. 1-6, in the embodiment of this invention, a sex toy with universal connecting structure includes an outer cup body 10, a sperm collection cup sleeve 20, an inner cup body 30, a guide part 40, a power part 50, an eccentric wheel drive assembly 60 and an electric control part 70. The sperm collection cup sleeve 20 is installed by using the outer cup body 10 as the main body, and then the sperm collection cup sleeve 20 is pushed by the inner cup body 30 to extract sperm. Generally, the sperm collection cup sleeve 20 is made of soft material; the cup mouth of the sperm collection cup sleeve 20 is fixed, and the operation of sperm collection could be realized by pushing the inner cup body 30 inside. Specifically, the inner cup body 30 is slidably connected inside the outer cup body 10 through the guide part 40, the sperm collection cup sleeve 20 is positioned between the outer cup body 10 and the inner cup body 30, the cup mouth of the sperm collection cup sleeve 20 is hermetically connected with the cup mouth of the outer cup body 10, the outer cup bottom of the sperm collection cup sleeve 20 is connected with the inner cup bottom of the inner cup body 30. The power part 50 and the electric control part 70 are fixedly installed in the outer cup body 10, and are electrically connected, the eccentric wheel drive assembly 60 is drivingly connected between the power part 50 and the outer cup bottom of the inner cup body 30, the power part 50 drives the inner cup body 30 to reciprocate through the eccentric wheel drive assembly 60, and is combined with the guide part 40 under the action of the eccentric wheel drive assembly 60, so that the power generated by the power part 50 could drive the inner cup body 30 to reciprocate. Based on the cooperation of this structure, the inner cup body 30 could swing while reciprocating, this invention improves the structure of the guide part 40, which is embodied in that the guide part 40 includes a guiding rod 41 arranged inside the outer cup body 10, a guiding slider 42 slidably connected to the guiding rod 41, and a universal ball head piece 43 arranged outside the inner cup body 30, the guiding slider 42 is provided with a universal ball head hole 421 matched with the universal ball head piece 43, and the universal ball head piece 43 is movably connected to the universal ball head hole 421.

The matching of the universal ball head piece 43 and the universal ball head hole 421 is utilized, so that the inner cup body 30 could rotate along the position of the universal ball head hole 421 during the process of reciprocating along the guide part 40; in addition, due to the transmission structure adopts the eccentric wheel transmission assembly 60, the inner cup body 30 could swing while reciprocating, so that the reciprocating and swinging are simultaneously transmitted to the sperm collection cup sleeve 20, and the reciprocating action could assist the sperm collection and with the effect of swinging or generating vibration, which is beneficial to improving the efficiency of sperm collection. Besides, the matching of the universal ball head piece 43 and the universal ball head hole 421 is utilized, so that the smoothness and stability of the reciprocating operation of the inner cup body 30 could be greatly improved, and finally, the power transmission efficiency is improved, and the noise generated by the operation of internal parts is reduced.

Figure 6:
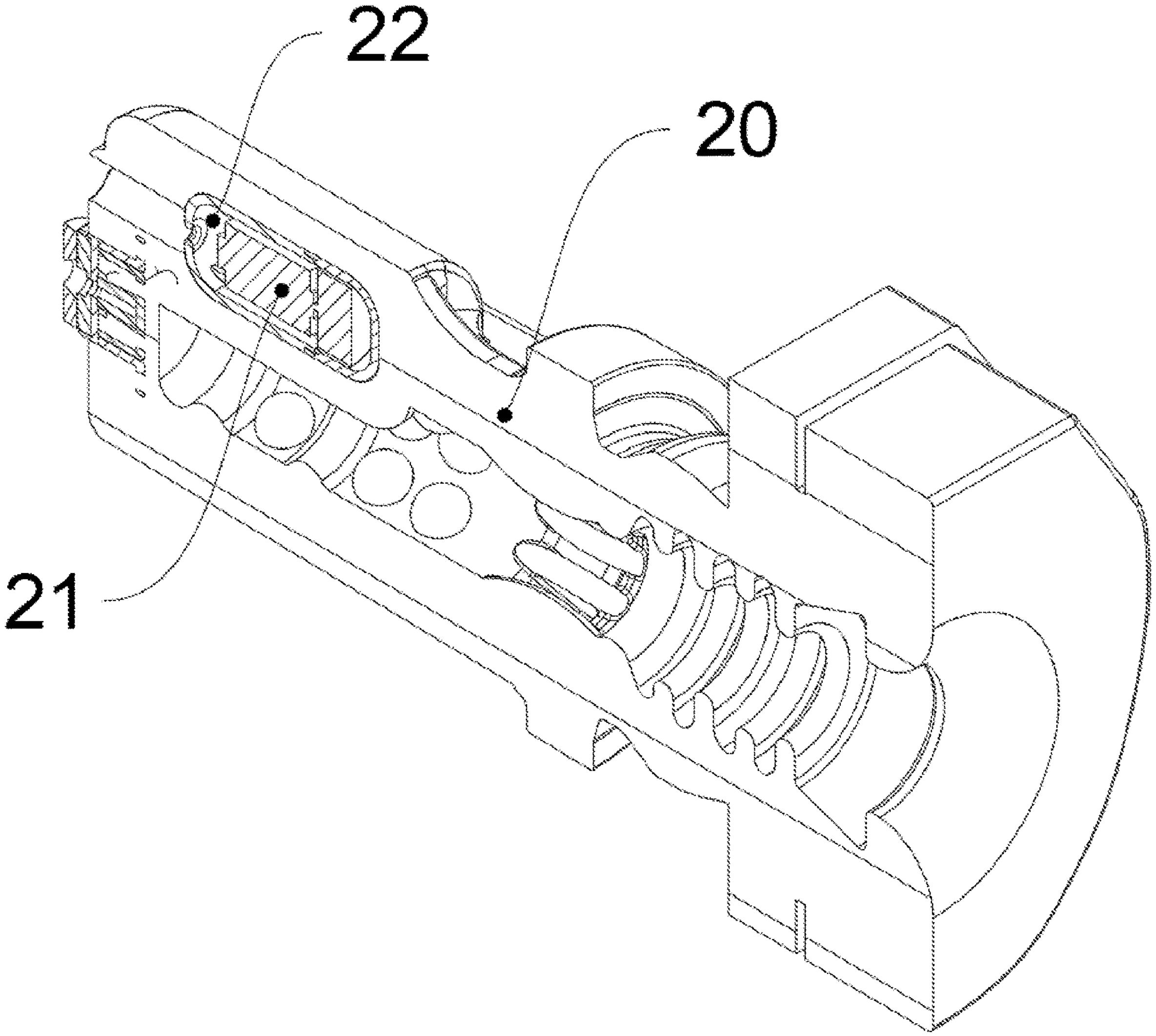
FIG. 6 is the cross-sectional view of the sperm collection cup sleeve of the this invention.

Referring to FIG. 6, in order to make the sperm collection cup sleeve 20 generate reciprocating and swinging movements and also equipped with the effect of vibration, the vibrator 21 could be arranged inside the sperm collection cup sleeve 20, and the vibration effect generated by the vibrator 21 could urge the sperm collection cup sleeve 20 to generate vibration effect. In order to solve the arrangement and wiring problems of the vibrator 21, the capsule bin 22 with the backward opening could be formed on the outer side of the sperm collection cup sleeve 20, the vibrator 21 is arranged in the capsule bin 22, and the vibrator 21 is electrically connected with the electric control part 70 through the opening of the capsule bin 22, as for the problem of blocking the circuit of the vibrator 21, due to the inner cup body 30 only provides power to the sperm collection cup sleeve 20 and has no sealing requirement, the inner cup body 30 could be set as the hollow structure, so that the wires connecting the vibrator 21 could enter the outer cup body 10 through the hollow structure on the inner cup body 30 after passing through the capsule bin 22.

Figure 3:
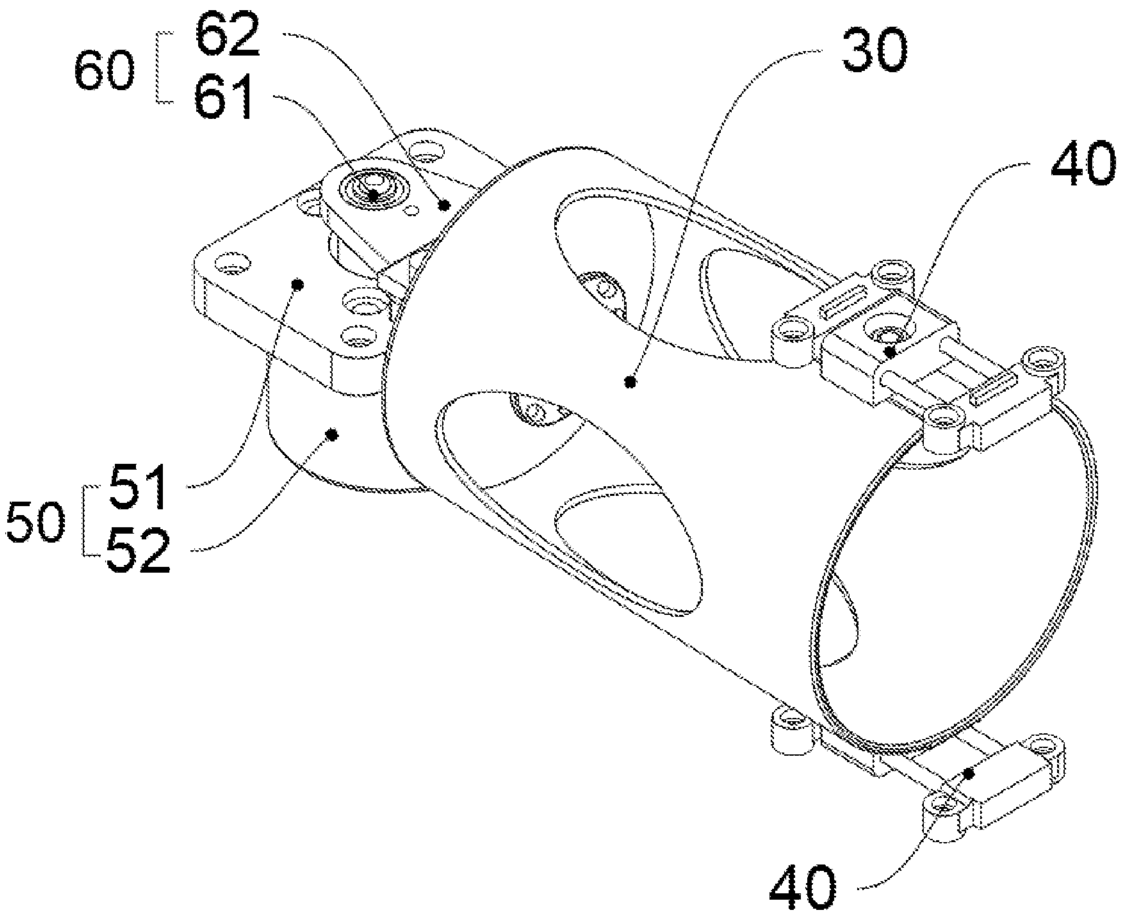
FIG. 3 is the perspective view of the inner cup body, the guide part, the power part and the eccentric wheel transmission assembly of this invention.
Figure 4:
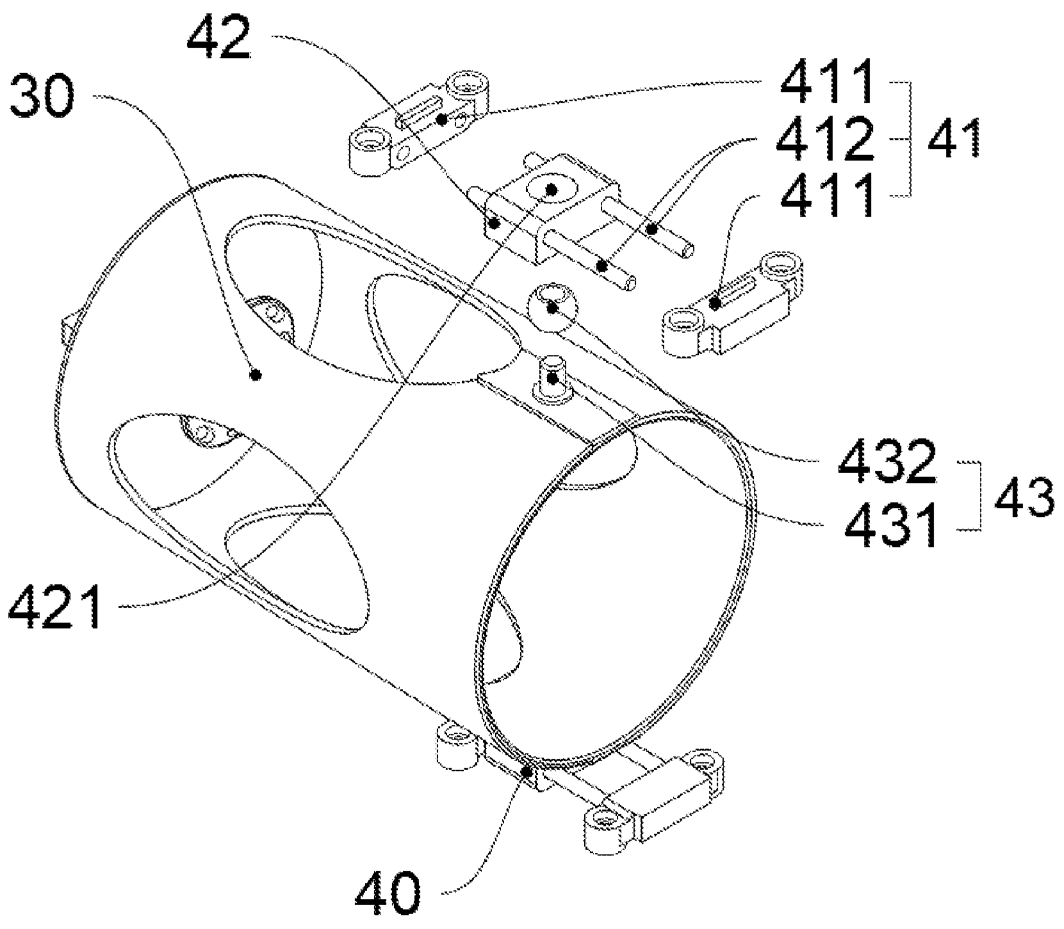
FIG. 4 is the perspective view of the inner cup body and the guide part of this invention.
Figure 5:
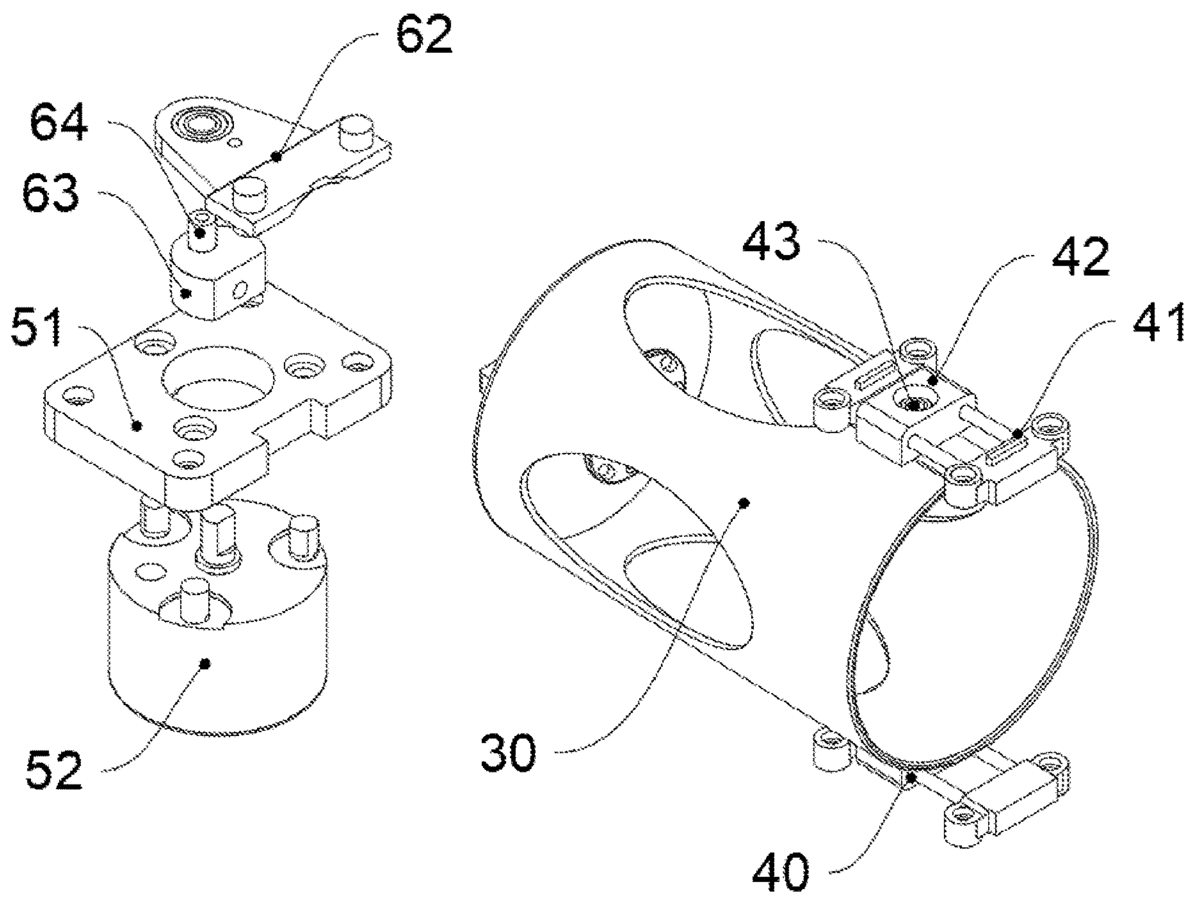
FIG. 5 is the explosive view of the power part and eccentric wheel transmission assembly in FIG. 3 of this invention.

Referring to FIGS. 3-5, considering the stability of sliding fit between the inner cup body 30 and the outer cup body 10, there are two guide parts 40, which are evenly distributed between the outer cup body 10 and the inner cup body 30. The fixing of the guiding rod 41 is that, the guiding rod 41 includes two fixing seats 411 fixedly installed inside the outer cup body 10 and two guiding rods 412 connected between the two fixing seats 411; the two guiding rods 412 are arranged in parallel, and the guiding slider 42 is slidably connected with the two guiding rods 412, the structural cooperation of the universal ball head piece 43 and the universal ball head hole 421 is based on the fact that the universal ball head piece 43 comprises the connecting column 431 arranged outside the inner cup body 30 and the universal ball 432 rotatably connected to the connecting column 431, and the universal ball 432 could be movably connected with the universal ball head hole 421; the universal ball head hole 421 is in the structure of cylindrical, and the universal ball 432 is in sliding contact with the inner wall of the universal ball head hole 421.

Referring to FIGS. 3 and 5, the eccentric wheel drive assembly 60 includes the eccentric wheel part 61 dynamically connected to the power main body and the push block 62 rotatably connected to the eccentric wheel part 61. The push block 62 is fixedly connected with the inner cup body 30, and the eccentric operation of the eccentric wheel part 61 drives the rotationally connected push block 62 to realize reciprocating and swinging motion, so that the eccentric wheel drive assembly 60 could drive the inner cup body 30 to realize the reciprocating and swinging motion. The power part 50 includes the motor base 51 fixedly installed in the outer cup body 10 and the motor 52 fixedly installed in the motor base 51. The eccentric wheel part 61 is provided with the turntable 63 dynamically connected with the motor 52 and the eccentric column 64 which is arranged on the turntable 63 and deviates from the axis of the turntable 63, and the push block 62 is rotatably connected with the eccentric column 64.

Figure 2:
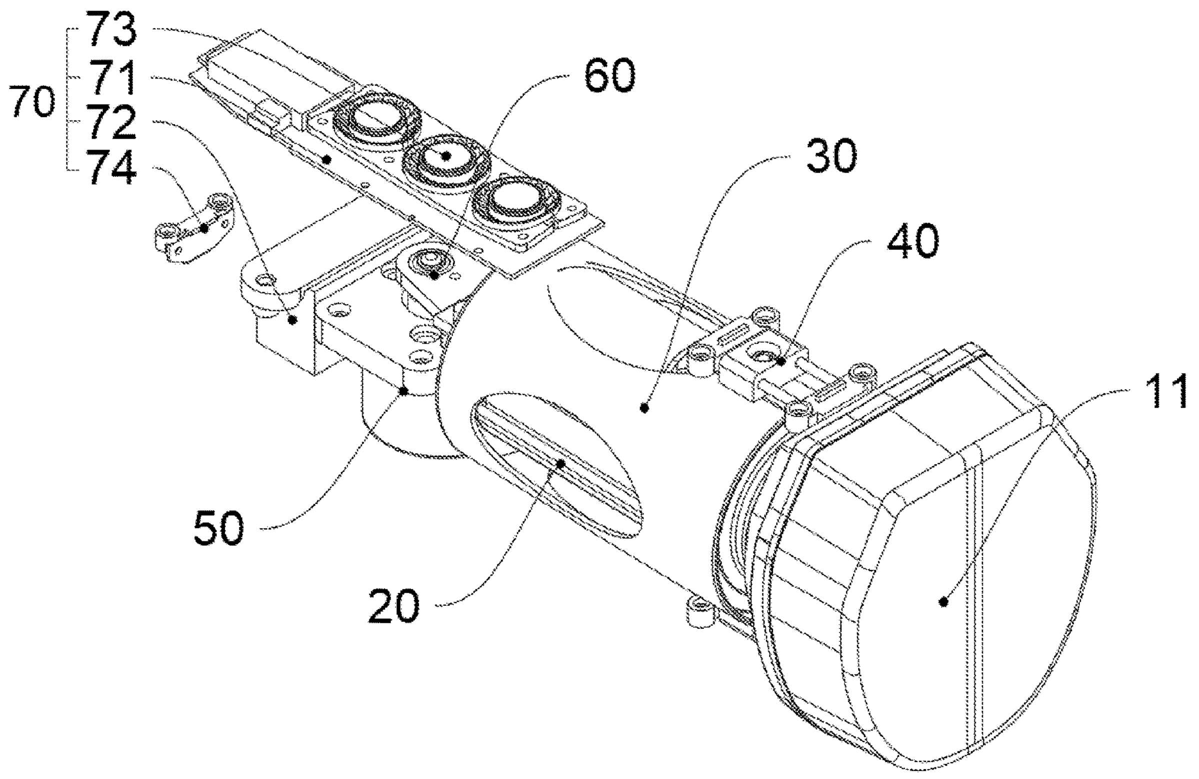
FIG. 2 is the perspective view of this invention without outer cup body.

Referring to FIGS. 1-2, the electric control part 70 includes the electric control board 71 and the battery 72 arranged inside the outer cup body 10. The electric control board 71 is provided with the operation button 73 and the charging interface 74 exposed outside the outer cup body 10. The battery 72, the charging interface 74, the operation button 73, the power part 50 and the vibrator 21 are all electrically connected with the electric control board 71. Referring to FIGS. 1-2, the cup cover 11 is also clamped at the cup mouth of the outer cup body 10 to protect the sperm collection cup sleeve 20.

It is obvious to those skilled in this field that this invention is not limited to the details of the above-mentioned exemplary embodiments, but could be realized in other specific forms without departing from the spirit or essential characteristics of this invention. Therefore, the embodiments should be considered in all aspects as illustrative and not restrictive, and the scope of the invention is defined by the appended claims rather than the above description, so it is intended to embrace all changes that come within the meaning and range of equivalents of the claims.

What is claimed is:

1. A sex toy with universal connecting structure comprising an outer cup body (10), a sperm collection cup sleeve (20), an inner cup body (30), a guide part (40), a power part (50), an eccentric wheel drive assembly (60) and an electric control part (70); wherein the inner cup body (30) is slidably connected inside the outer cup body (10) through the guide part (40), the sperm collection cup sleeve (20) is positioned between the outer cup body (10) and the inner cup body (30), cup mouth of the sperm collection cup sleeve (20) is hermetically connected with cup mouth of the outer cup body (10), outer cup bottom of the sperm collection cup sleeve (20) is connected with inner cup bottom of the inner cup body (30), The power part (50) and the electric control part (70) are fixedly installed in the outer cup body (10), and are electrically connected, the eccentric wheel drive assembly (60) is drivingly connected between the power part (50) and outer cup bottom of the inner cup body (30), the power part (50) drives the inner cup body (30) to reciprocate through the eccentric wheel drive assembly (60), wherein the guide part (40) includes a guiding rod (41) arranged inside the outer cup body (10), a guiding slider (42) slidably connected to the guiding rod (41), and a universal ball head piece (43) arranged outside the inner cup body (30); the guiding slider (42) has a universal ball head hole (421) matched with the universal ball head piece (43), and the universal ball head piece (43) is movably connected to the universal ball head hole (421).

2. A sex toy with universal connecting structure according to claim 1, wherein a capsule bin (22) with the backward opening is formed on the outer side of the sperm collection cup sleeve (20), a vibrator (21) is arranged in the capsule bin (22), and the vibrator (21) is electrically connected with the electric control part (70) through the opening of the capsule bin (22).

3. A sex toy with universal connecting structure according to claim 1, wherein there are two guide parts (40), which are evenly distributed between the outer cup body (10) and the inner cup body (30).

4. A sex toy with universal connecting structure according to claim 1, wherein the guiding rod (41) includes two fixing seats (411) fixedly installed inside the outer cup body (10) and two guiding rods (412) connected between the two fixing seats (411); the two guiding rods (412) are arranged in parallel, and the guiding slider (42) is slidably connected with the two guiding rods (412).

5. A sex toy with universal connecting structure according to claim 1, wherein the universal ball head piece (43) comprises a connecting column (431) arranged outside the inner cup body (30 and a universal ball (432) rotatably connected to the connecting column (431), and the universal ball (432) is movably connected with the universal ball head hole (421).

6. A sex toy with universal connecting structure according to claim 5, wherein the universal ball head hole (421) is cylindrical, and the universal ball (432) is in sliding contact with an inner wall of the universal ball head hole (421).

7. A sex toy with universal connecting structure according to claim 1, wherein the eccentric wheel drive assembly (60) includes an eccentric wheel part (61) dynamically connected to power main body and a push block (62) rotatably connected to the eccentric wheel part (61), and the push block (62) is fixedly connected with the inner cup body (30).

8. A sex toy with universal connecting structure according to claim 7, wherein the power part (50) includes a motor base (51) fixedly installed in the outer cup body (10) and a motor (52) fixedly installed in the motor base (51); and the eccentric wheel part (61) has a turntable (63) dynamically connected with the motor (52) and an eccentric column (64) which is arranged on the turntable (63) and deviates from axis of the turntable (63), and the push block (62) is rotatably connected with the eccentric column (64).

9. A sex toy with universal connecting structure according to claim 2, wherein the electric control part (70) includes an electric control board (71) and a battery (72) arranged inside the outer cup body (10); and the electric control board (71) has an operation button (73) and a charging interface (74) exposed outside the outer cup body (10); the battery (72), the charging interface (74), the operation button (73), the power part (50) and the vibrator (21) are all electrically connected with the electric control board (71).

10. A sex toy with universal connecting structure according to claim 1, wherein the cup cover (11) is also clamped at the cup mouth of the outer cup body (10) to protect the sperm collection cup sleeve (20).

* * * * *